July 16, 1968                P. J. WYNNE                3,393,264
                         ELECTRIC ARC FURNACES
Filed June 15, 1964                                   2 Sheets-Sheet 1
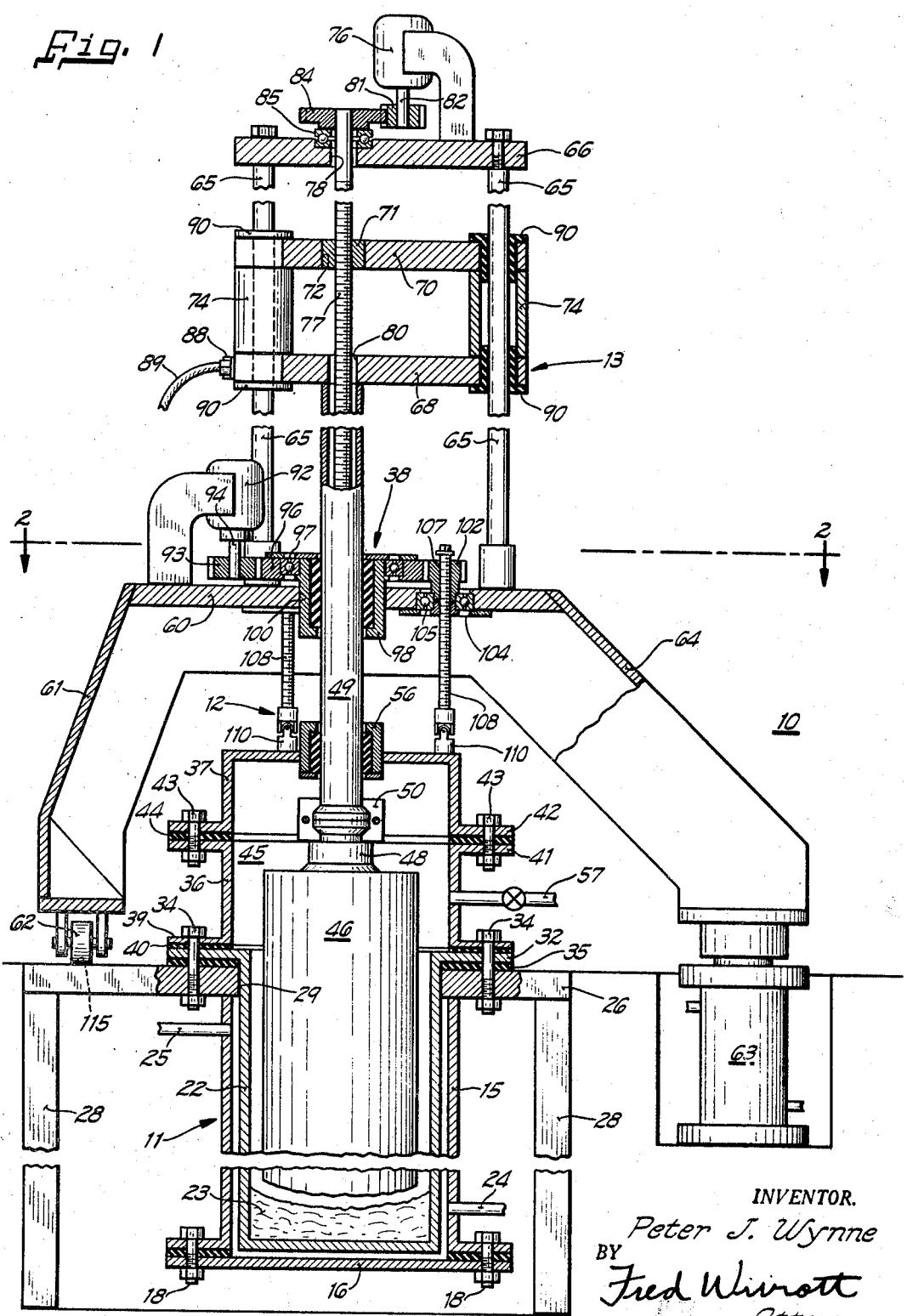
INVENTOR.
Peter J. Wynne
BY Fred Wirrott
    Attorney

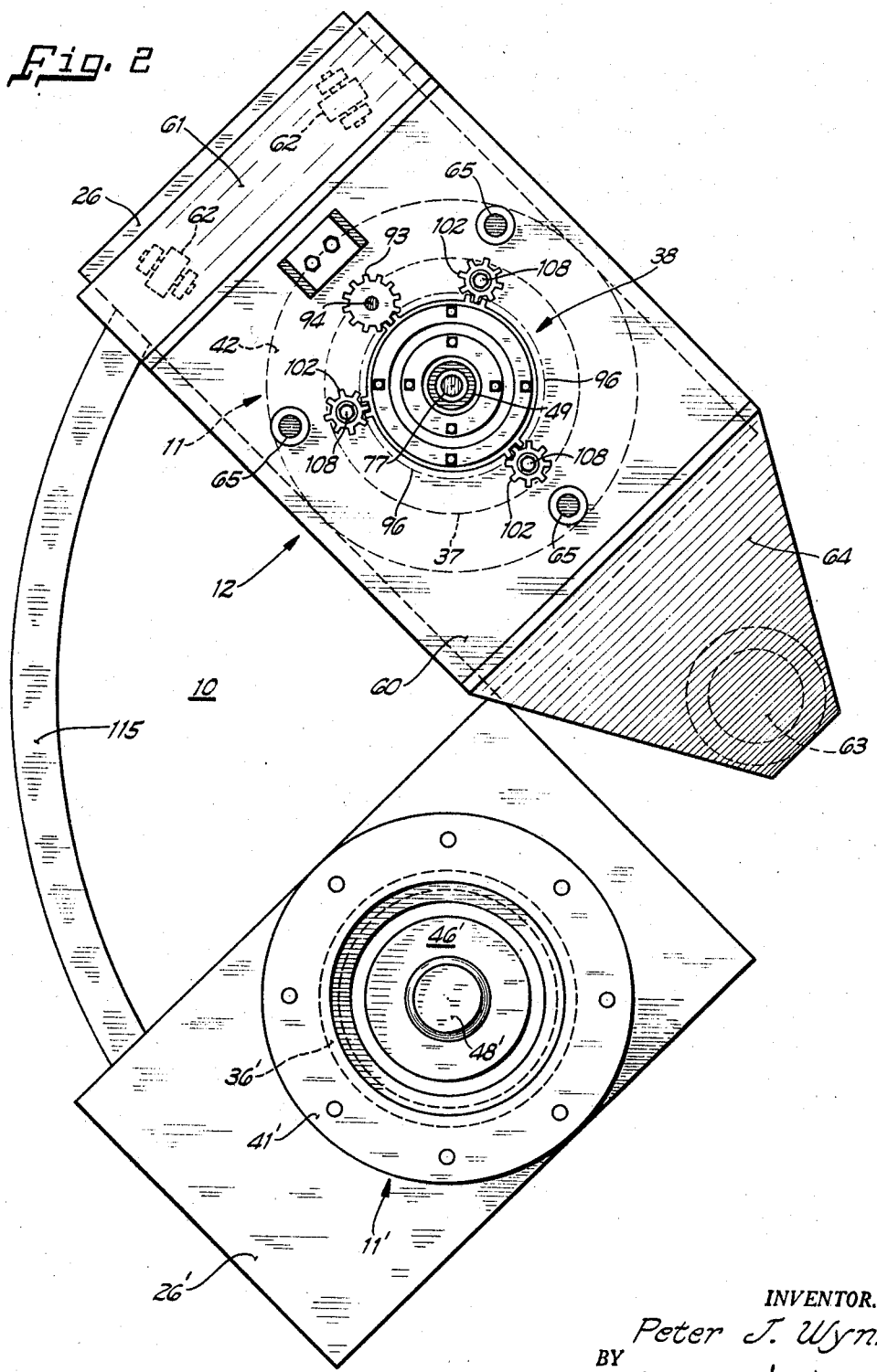

United States Patent Office
3,393,264
Patented July 16, 1968

3,393,264
ELECTRIC ARC FURNACES
Peter J. Wynne, Pittsburgh, Pa., assignor, by mesne assignments, to Lectromelt Corporation, Pittsburgh, Pa., a corporation of Delaware
Filed June 15, 1964, Ser. No. 374,992
9 Claims. (Cl. 13—9)

ABSTRACT OF THE DISCLOSURE

An electric arc furnace having a plurality of separate crucibles and an electrode and closure for the crucible, a movable support means, and electrode and crucible closure holding structures each movable independently of the other and mounted on the support means vertically above the crucibles so that the support means can be moved to bring the electrode and closure into alignment over alternate crucibles for subsequently charging the crucible to define an ingot therein.

This invention relates to electric arc furnaces and, more particularly, to furnaces of the type wherein a consumable electrode is melted in a vacuum or controlled atmosphere.

Consumable electrode electric arc furnaces have been widely used for such applications as the melting of refractory metals of which titanium is an example. Such furnaces in general, include a sealed chamber wherein a consumable electrode is progressively melted under a controlled atmosphere and the resulting molten metal collected in a crucible to form an ingot. Melting is accomplished by means of an arc which is drawn between the consumable electrode and the ingot and which is sustained by relatively large direct currents. As the ingot forms, the electrode length gradually decreases so that it must be lowered in order to maintain the proper arc length necessary for the desired melting conditions. For this purpose, a motor-driven electrode ram is provided for feeding the electrode toward the ingot in accordance with the electrical conditions in the arc. After the electrode has been completely consumed, the ingot must be allowed to cool and then removed from the crucible prior to the initiation of another melting operation. Because the time required for such ingots to cool is relatively long, it is desirable that a single electrode drive and ram assembly be mounted for successive operation over several crucibles.

In prior art assemblies wherein a single electrode drive was employed with multiple crucibles, it was necessary to provide means for raising the drive clear of the crucibles so that it could be moved from a position above one crucible to a position above another.

It is an object of the invention to provide apparatus for a consumable electrode electric arc furnace which facilitates the use of a single electrode drive assembly with a plurality of crucibles.

A further object of the invention is to provide a consumable electrode arc furnace having a single electrode drive assembly usable with plural crucibles wherein it is not necessary to lift the entire drive assembly in order to position it above the various crucibles.

A more specific object of the invention is to provide in an arc melting furnace, the combination of a plurality of vessels each adapted to receive an ingot formed by the melting of a consumable electrode therein, closure means selectively engageable with the upper ends of the vessels, an electrode drive mechanism movably mounted for being alternately positioned above the vessels and extending through the closure means for supporting an electrode in the vessels, and drive means for raising the closure means vertically relative to the vessels so that the electrode drive mechanism may be moved to a position above an alternate vessel without being lifted vertically relative to the vessels.

These and other objects and advantages of the instant invention will become more apparent from the detailed description thereof taken with the accompanying drawings wherein:

FIG. 1 is a side elevational view, partly in section, of a consumable electrode electric arc furnace incorporating the instant invention; and FIG. 2 is a view taken along lines 2—2 of FIG. 1.

Referring now to the drawings in greater detail, FIG. 1 shows a consumable electrode arc melting furnace designated by the reference numeral 10 and having a crucible section 11, a middle section 12 and an upper electrode drive assembly 13.

The crucible section 11 includes an outer substantially cylindrical shell 15 having a bottom closure member 16 which is affixed thereto in an hermetically sealed relation by means of bolts 18 to provide a cooling jacket for a crucible 22 disposed therein and which receives an ingot 23 formed from the metal being melted. The shell 15 is provided with a cooling fluid inlet pipe 24 and an outlet pipe 25. A horizontal mounting plate 26 is supported adjacent the upper end of the shell 15 by vertical columns 28 and has a central aperture 29 for receiving the upper end of the crucible 22. A flange 32 extends outwardly from the upper end of the crucible 22 and is affixed to the upper surface of the mounting plate 26 by bolts 34. A gasket 35 is provided around the periphery of the aperture 29 and below the flange 32.

The middle section 12 of the furnace 10 includes a lower middle section 36, an upper middle section 37 and an upper middle section drive assembly 38. The lower middle section 36 has a generally cylindrical configuration co-radial with the crucible 22 and is affixed to the upper end thereof by an outwardly extending flange 39 at its lower end which overlays the flange 32 on the crucible and which is held thereagainst by the bolts 34. A gasket 40 is provided between the flanges 32 and 39 to seal this junction. A second flange 41 extends outwardly from the upper end of the lower middle section 36 and is engaged by a corresponding flange 42 on the lower end of the inverted, cup-shaped upper middle section 37. Bolts 43 secure the flanges 41 and 42 and comprises a gasket 44 therebetween to insure a fluid-tight joint.

The upper middle section 37 forms a closure for the hollow assembly 45 comprising the crucible 22, the lower middle section 36 and the upper middle section 37.

An electrode 46 is disposed within the hollow assembly 45 and has a stub 48 integrally formed at its upper end for releasable attachment to the bottom of a hollow electrode ram 49 by a clamp 50. The electrode ram 49 slidably passes through a sealing bushing 56 which provides a fluid-tight seal for the enclosure 45 and, in addition, electrically insulates electrode ram 49 from the upper middle section 37.

A pipe 57 is connected to and communicates with the interior of the enclosure 45 for placing the latter in communication with an evacuator or source of inert gas if a partial vacuum or inert gas atmosphere is required during the melting operation.

A generally rectangular base plate 60 is disposed above the upper middle section 37 and is mounted on a first frame assembly 61 whose lower end is supported on a pair of wheels 62 which engage a curved track 115 mounted on the upper surface of the plate 26 and second frame assembly 64 which engages a rotary hydraulic cylinder 63 whose purpose will be explained in greater detail hereinbelow. The plate 60 supports the upper middle section drive assembly 38 and the electrode drive assembly 13.

The electrode drive assembly 13 is supported above the base plate 60 by vertically extending rods 65 whose lower ends are fixed to the plate 60 and whose upper ends support a top plate 66. The drive assembly 13 includes a first generally triangularly shaped plate 68 which is affixed to the upper end of the electrode ram 49 and a second generally triangularly shaped plate 70 disposed vertically about the plate 68 and having a nut 71 affixed in an aperture 72 provided therein and concentric with the ram 49. A tubular member 74 is slidably disposed on each of the support rods 65 and each is affixed at its lower end to the first triangular plate 68 and at its upper end to the second triangular plate 70 so that the plates 68 and 70 are coupled for sliding vertical movement on the support rods 65.

The electrode drive assembly also includes a motor 76 suitably mounted on the upper plate 66 and a drive screw 77 which threadably engages the fixed nut 71 on the second triangular plate 70 and extends vertically downward through apertures 78 and 80 in the plates 66 and 68, respectively, and into the hollow interior of the electrode ram 49. A pinion 81 is carried on the output shaft 82 of the motor 76 and engages a gear 84 affixed to the upper end of the screw shaft 77 and rotatably mounted about the aperture 78 in plate 66 by a suitable bearing assembly 85.

Electrical energy is supplied to the electrode 46 through a terminal 88 mounted on plate 68 and which is constructed and arranged to receive a flexible conductor 89. Current flows from the plate 68 through the electrode ram 49, the clamp 50, the stub 48 and to the electrode 46. Insulating bushings 90, of any suitable material such as fluorinated hydrocarbon, insulate the guide rods 65 from the plates 68 and 70 and the tubes 74.

The upper middle section drive assembly includes a motor 92 suitably mounted on the base plate 60 and a pinion 93 affixed to the motor output shafft 94. Pinion 93 engages a ring gear 96 which is rotatably mounted by means of a bearing 97 on a bushing 98 which is mounted around an aperture 100 formed in the support plate 60. The bushing 98 slidably receives the electrode ram 49 and insulates the same from the base plate 60. Three small gears 102 engage the ring gear 96 at approximately 120° intervals and each is rotatably mounted around corresponding apertures 104 formed in the base plate 60 by suitable bearings 105. Each of the small gears 102 has a suitable internal threaded aperture 107 for engaging the upper end of a screw shaft 108, the lower end of which is coupled to the upper surface of the upper middle section by a universal coupling 110.

The electrode drive assembly motor 76 may be of the reversible, variable speed, DC type which is controlled in accordance with electrode voltage current conditions. The motor control which is not shown, but which is well-known in the art, causes the motor 76 to rotate in a direction which maintains the arc between the electrode 46 and the ingot 23 at a relatively uniform length. Thus, when the arc length is too short, the motor will rotate in a first direction to raise the electrode 46, and when the arc length is too long, the motor 76 will rotate in an opposite direction to lower the electrode 46. However, since the electrode 46 has a slightly smaller diameter than the crucible 22, the general direction of movement of the electrode will be downward during a melting operation.

More specifically, it can be seen from FIG. 1 that rotation of the motor 76 in a first direction will rotate the screw shaft 77 through the agency of the pinion 81 and the gear 84. As the screw shaft 77 rotates, relative movement will be produced between it and the nut 71 fixed to the plate 70. This will cause the plate 70 to move in the direction governed by the direction of rotation of the screw shaft 77 and this will in turn be transmitted to the electrode 46 through the agency of the tubular members 77, the plate 68 and the electrode ram 49.

After the electrode 46 has been melted so that substantially only the stub 48 remains, the motor 76 is driven in a direction which raises the clamp 52 to its uppermost position in the chamber 45. The bolts 43 are then removed to release the upper middle section 37 from the lower middle section 36. The motor 92 is then operated to rotate the gears 102 through the agency of the pinion 93 and the ring gear 96 in a direction which raises each of the screw shafts 108. As a result, the upper middle section 37 is raised to a position free of the lower middle section 36. The motor 76 is then reactuated in a direction which raises the electrode clamp 50 and the stub 48 to a position above the upper flange 41 of the lower middle section 36.

A cover plate (not shown but which has a shape similar to the upper middle section 37) may then be placed over the lower middle section 36 and secured thereto by bolts 43 so as to reseal the enclosure 45 whereby the ingot may be cooled in a controlled atmosphere. In addition, the clamp 50 may be released and the stub 48 removed.

When the upper middle section 37 and the electrode clamp 50 are in their elevated positions, the rotary hydraulic cylinder is actuated to pivot the base plate 60 and the frame assemblies 61 and 62 in a counterclockwise direction as viewed in FIG. 2 to a position above a second crucible 11' as the wheels 62 roll on an arcuate track 115. After the electrode drive assembly 13 has been positioned above the second crucible 11', the electrode ram 49 is lowered until the clamp 50 is in a position to be secured to the stub 48' on an electrode 46' which has previously been disposed within the crucible 11'. The motor 92 is then operated in a direction which lowers the upper middle section 37 until its lower flange 42 engages the flange 41' on the second upper middle section 36', whereupon the bolts 43 are re-inserted and the closure of the auxiliary crucible resealed.

It can thus be seen that the upper middle section drive assembly 38 which raises the upper middle section to a position clear of the lower middle section 36 and allows the electrode clamp 50 and stub 48 to be similarly raised, eliminates the necessity for expensive apparatus to lift the entire drive assembly so that it can be positioned over an auxiliary crucible.

While only a single embodiment of the invention has been shown and described, it is not intended to be limited thereby but only by the scope of the appended claims.

I claim:

1. In an arc melting furnace, the combination of a plurality of vessels each adapted to receive an ingot formed by the melting of a consumable electrode therein, closure means removably selectively securable to the upper ends of said vessels, base means, roller means supporting one side of said base means and rotary drive engaging the other side of said base means for moving the same in a horizontal arcuate path on said roller means from a position above one of said vessels to a position above another of said vessels, an electrode drive mechanism mounted on said base means and extending through said closure means for supporting an electrode in said vessels, and drive means mounted on said base and including a reversible electric motor, gear means coupled to said motor, screw shaft means coupled to said gear means and to said closure means for raising and lowering said closure means vertically relative to said vessels so that said electrode drive mechanism may be moved to a position above an alternate one of said vessels without being lifted vertically relative to said vessels.

2. In an arc melting furnace, the combination of a plurality of vessels each adapted to receive an ingot formed by the melting of a consumable electrode therein, closure means removably selectively securable to the upper ends of said vessels for sealing the same, a base plate, roller means supporting one side of said base plate and rotary drive means engaging the other side of said base plate for moving the same in a horizontal arcuate path on said roller means from a position above one of said vessels to a position above another of said vessels, an electrode drive mechanism mounted on said base plate and including an electrode ram extending through said closure means for supporting an electrode in said vessels, and drive means mounted on said base plate and including a ring gear rotatably mounted on said base plate circumjacent said electrode ram, a reversible electric motor coupled to said ring gear, a plurality of screw shafts coupled to said ring gear and extending downwardly through said base plate and being coupled at their lower ends to said closure means for raising and lowering said closure means vertically relative to said vessels so that said electrode drive mechanism may be moved to a position above an alternate one of said vessels without being lifted vertically relative to said vessels.

3. In an arc melting furnace, the combination of a plurality of crucible units each adapted to receive an ingot formed by the melting of a consumable electrode therein, closure means removably selectively securable to the upper ends of said crucible units, for sealing the same, base means, roller means supporting one side of said base means and rotary drive means for moving said base means horizontally on said roller means from a position above one of said crucible units to a position above another of said units, an electrode drive mechanism mounted on said base means, said electrode drive mechanism including an electrode ram extending through said closure means and having an electrode holder at its lower end for supporting an electrode in said crucible units, said electrode drive means including a first electric motor and first screw shaft means for moving said electrode ram relative to said crucible in accordance with electrode voltage and current conditions, a second drive means mounted on said base means and including a second electric motor and a second screw shaft means coupled to said closure means for raising said closure means vertically relative to said crucible units so that said electrode drive mechanism may be moved to a position above an alternate crucible unit without being lifted vertically relative to said crucible units.

4. In an arc melting furnace, the combination of a plurality of crucible units each adapted to receive an ingot formed by the melting of a consumable electrode therein, closure means removably selectively securable to the upper ends of said crucible units for sealing the same, a base plate, roller means supporting one side of said base plate and rotary drive means for moving said base plate horizontally on said roller means in an arcuate path from a position above one of said crucible units to a position above another of said units, an electrode drive mechanism mounted on said base plate, said electrode drive mechanism including a hollow electrode ram extending vertically through said sealing means and having an electrode holder at its lower end for supporting an electrode in said crucible units, cross plate means affixed to the upper end of said electrode ram and having nut means affixed thereto, said electrode drive means also including a first reversible electric motor and first screw shaft means driven by said first electric motor and engaging said nut means for moving said electrode ram relative to said crucible units in accordance with electrode voltage and furnace conditions and a second drive means mounted on said base plate and including a second reversible electric motor and a second screw shaft means coupled to said closure means, gear means coupled to said second electric motor and to said second screw shaft means for raising said closure means vertically relative to said crucible units so that said electrode drive mechanism may be moved to a position above an alternate crucible unit without being lifted vertically relative to said crucible units.

5. In an arc melting furnace, the combination of a plurality of crucibles each adapted to receive and melt a consumable electrode to define an ingot therein, support means, means mounting the support means to move horizontally between alternate positions above the respective crucibles, a ram having means on a lower end thereof to hold an electrode disposed within the respective crucible, drive mechanism between the support means and the ram for raising and lowering the ram relative to the crucibles, a closure means disposed in sealed sliding relationship to the ram and adapted in the alternate positions of the support means to be removably selectively secured to the upper end of the respective crucible for sealing the same, and drive means between the support means and the closure means operable to raise and lower said closure means and to hold said closure means spaced above the respective crucible to permit the support means to be moved between the alternate positions.

6. In an arc melting furnace according to claim 5, wherein said drive mechanism includes a threaded shaft and a means to rotate the shaft, and wherein the shaft is rotatably mounted but axially fixed relative to one of the support means or ram and is threadably engaged to the other of the support means or ram, so that shaft rotation raises or lowers the ram relative to the crucible units.

7. In an arc melting furnace according to claim 6, wherein said shaft extends in the direction of the ram, and wherein the ram is hollow and freely receives varying portions of the shaft.

8. In an arc melting furnace according to claim 5, wherein said drive means includes a threaded shaft and a means to rotate the shaft, and wherein the shaft is rotatably mounted but axially fixed relative to one of the support means or closure means and is threadably engaged to the other of the support means or closure means, so that shaft rotation raises or lowers the closure means as required.

9. In an arc melting furnace according to claim 6, wherein said drive means includes a threaded shaft and a means to rotate the shaft, and wherein the shaft is rotatbly mounted but axially fixed relative to one of the support means or closure means and is threadably engaged to the other of the support means or closure means, so that shaft rotation raises or lowers the closure means as required.

References Cited

UNITED STATES PATENTS

| | | | |
|---|---|---|---|
| 309,540 | 12/1884 | Hainsworth | 164—323 X |
| 1,827,852 | 10/1931 | Marshall | 13—14 |
| 2,922,023 | 1/1960 | Hackman et al. | 219—127 X |
| 3,152,372 | 10/1964 | Hopkins | 164—252 X |
| 3,213,495 | 10/1965 | Buehl | 164—252 X |
| 3,249,673 | 5/1966 | Moore | 13—16 |

BERNARD A. GILHEANY, *Primary Examiner.*

H. B. GILSON, *Assistant Examiner.*